(No Model.) 2 Sheets—Sheet 1.
A. R. CAVNER.
POWER TRANSMITTING MECHANISM FOR CARS.
No. 451,913. Patented May 12, 1891.
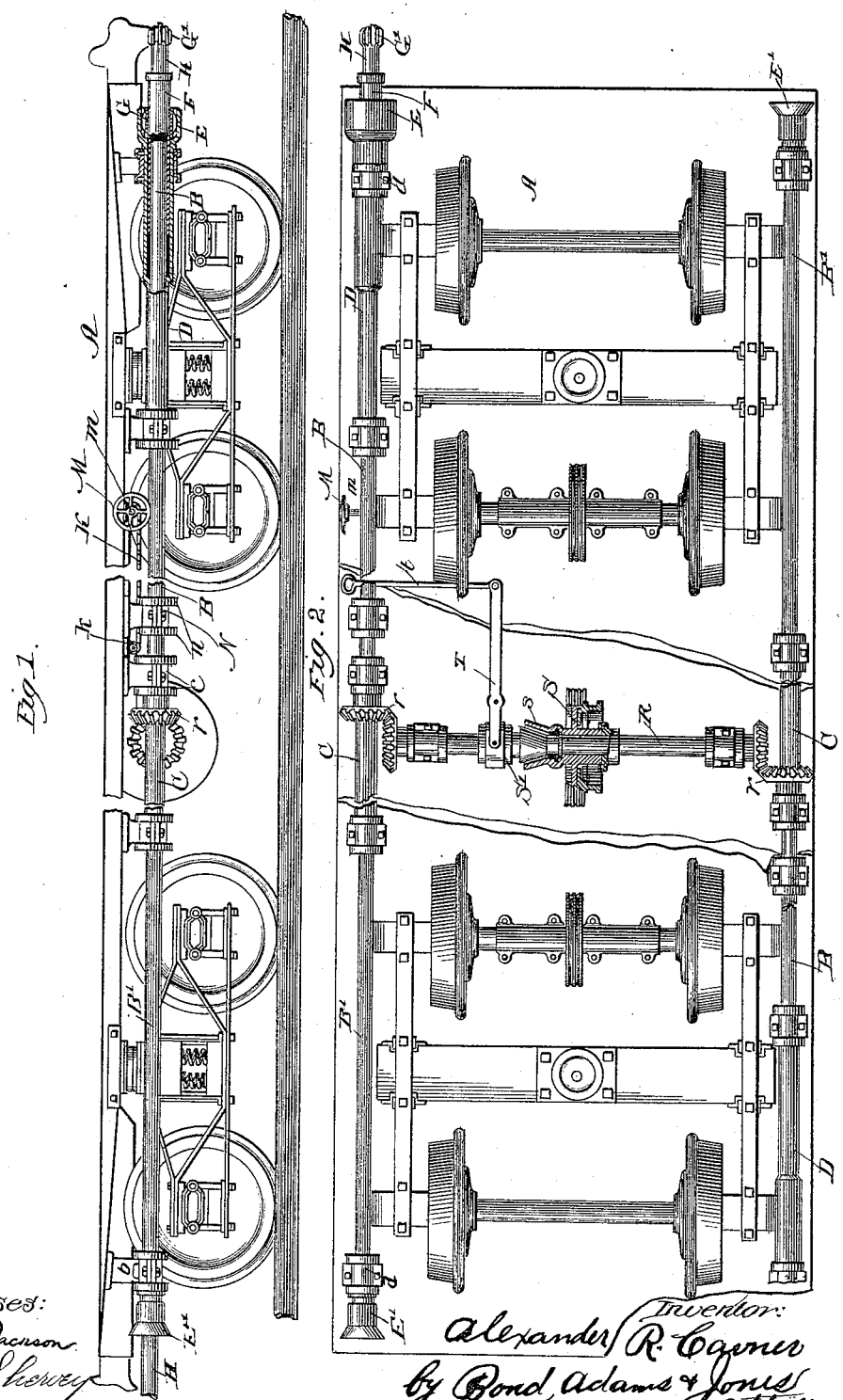

(No Model.) 2 Sheets—Sheet 2.
A. R. CAVNER.
POWER TRANSMITTING MECHANISM FOR CARS.
No. 451,913. Patented May 12, 1891.
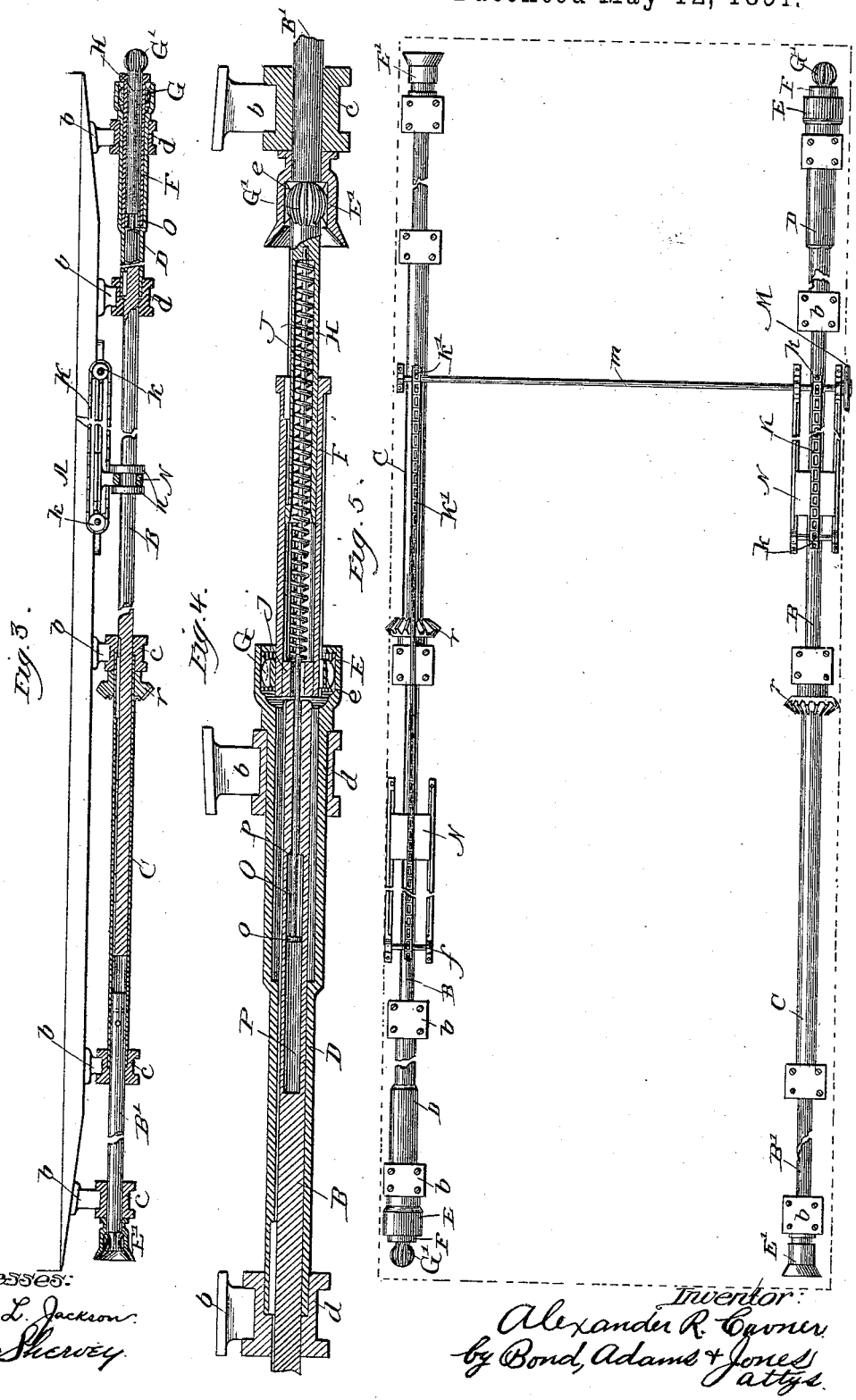

UNITED STATES PATENT OFFICE.

ALEXANDER R. CAVNER, OF CHICAGO, ILLINOIS.

POWER-TRANSMITTING MECHANISM FOR CARS.

SPECIFICATION forming part of Letters Patent No. 451,913, dated May 12, 1891.

Application filed November 22, 1890. Serial No. 372,383. (No model.)

*To all whom it may concern:*

Be it known that I, ALEXANDER R. CAVNER, residing at Chicago, county of Cook, and State of Illinois, and a citizen of the United States, have invented certain new and useful Improvements in Power-Transmission, of which the following is a specification, reference being had to the accompanying drawings, in which—

Figure 1 is a side elevation of a car to which my appliance is applied. Fig. 2 is an under side view of the car with my appliance applied. Fig. 3 is a detail, being a longitudinal section, showing the coupling device drawn in. Fig. 4 is a detail, being a longitudinal section, showing two parts coupled; and Fig. 5 is a detail, being an under side view of the parts shown, showing one of the operating couplings at the opposite ends of a car.

My present invention is particularly designed to be used in connection with my apparatus for applying power to cars in train, as shown in my application for a patent, Serial No. 346,676, filed April 5, 1890; but some of my improvements may be applied to other apparatus.

The first object of my invention is to provide an improved device for coupling two rotating shafts; second, to provide means for operating said coupling devices, and, third, to provide means for throwing the driving mechanism of a single car into and out of gear. I accomplish these objects as illustrated in the drawings and as hereinafter described.

That which I claim as new will be pointed out in the claims.

Similar letters refer to similar parts throughout the several views.

A represents a car to which I have shown my devices applied. This may be any form of car adapted to be driven by driving mechanism.

B represents a shaft for transmitting power. This shaft in the car shown is supported by suitable bearings, as hereinafter set forth.

B' represents a shaft in line with the shaft B.

C represents a hollow shaft, whose interior diameter is larger than the exterior diameter of the shaft B. The adjoining ends of the shafts B B' enter this tubular shaft C, as best shown in Fig. 3. The shaft B is provided with a feather adapted to slide longitudinally in the shaft C, so that the shafts B B' and C rotate together, while the shaft B may slide longitudinally. The shaft C is supported by suitable bearings $b$, so that it can rotate freely, a collar $c$ being secured upon the shaft C at the bearings $b$ to prevent the shaft C from moving longitudinally.

Upon the outer end of the shaft B is mounted a hollow or tubular shaft D, which is supported in suitable bearings $b$ and provided with collars $d$ at the bearings $b$ to prevent longitudinal movement. The shaft B is provided with a feather adapted to slide in a groove in the shaft D, so that the shafts B and D will rotate together and so that the shaft B can slide longitudinally within the shaft D. The outer end of the shaft D is provided with a bell-mouth E, which is provided interiorly with teeth or corrugations $e$. The outer end of the shaft B' is provided with a bell-mouth E', which is also provided with interior teeth or corrugations $e$.

F represents a hollow or tubular shaft, which is adapted to slide longitudinally within the shaft D and over the shaft B, as best shown in Fig. 4.

Upon the shaft F is mounted a ball-bearing G, which is provided with corrugations or teeth adapted to engage with the teeth or corrugations $e$ of the bell-mouth E. This ball-bearing G is provided with a feather adapted to enter a groove in the shaft F, so that it will rotate with said shaft and so that the shaft F can slide longitudinally through it.

H represents a shaft adapted to slide longitudinally in the shaft F and provided with a groove to receive a feather on such shaft F, so that it will rotate with such shaft F. Upon the outer end of the shaft H is a ball-bearing G', provided with teeth or corrugations adapted to engage with the teeth $e$ of the bell-mouth E'.

When either shaft B or B' upon a single car A is rotated, the other shaft will rotate with it. I have not shown any driving mechanism for rotating the shafts B B', as any motor for rotating the shafts may be employed.

As shown in Fig. 2, two shafts are located upon each car A, with a bell-mouth E' at diagonally-opposite corners, and a shaft D, with the bell-mouth E at the opposite end of the car from each bell-mouth E'. This arrangement brings a bell-mouth E and shafts F and H on each end of the car adjacent to the bell-mouth E' on the adjoining cars. When the ball-bearing G' enters the bell-mouth E' and engages with the teeth e, the shafts H and B' will be coupled so as to rotate together. In passing around curves the ball-bearings G and G' upon the coupling formed by the shafts F H permit the cars to swing laterally without interfering with the rotation of the shafts B B' and the coupling device. This form of coupling device also permits cars of slightly-different heights to be coupled without interfering with the rotation of the shafts B B'.

In order to keep the ball-bearing G' in engagement with the bell-mouth E', a spring J is employed, which is preferably located within the shafts F and H, as shown in Fig. 4, and abuts against the end of the shaft H and the blocks j, secured in the inner end of the shaft F. The spring acts to push the shaft H outwardly from the shaft F, and thereby holds the ball-bearing G' in the bell-mouth E'. The end of the groove in the shaft H forms a stop to prevent the shaft H from being pushed entirely from the shaft F. This spring J, by pushing outwardly upon the shaft H, keeps the ball-bearing G' within the bell-mouth E' and permits the distance between the adjacent ends of the cars to vary, as in backing or pushing and in passing around curves.

When the shafts B B' of adjoining cars are to be uncoupled, the ball-bearing G' is simply withdrawn from the bell-mouth E'.

In order to draw the shaft H and shaft F inwardly to prevent liability to breakage, the shaft B can be positively moved longitudinally at will by means of suitable lever mechanism, which, as here shown, is composed of an endless chain K, mounted upon suitable pulleys k, mounted in bearings beneath the body of the car A. One of the pulleys k is mounted upon a shaft provided with a hand-wheel or lever M, by which the chain can be drawn in either direction. The endless chain K is connected with the shaft B by means of a sleeve N, which fits between collars n upon the shaft B, as best shown in Fig. 3. The outer end of the shaft B is provided with a longitudinal recess P, as shown in Fig. 4, and a rod O extends through the shaft H, the shaft F, and a portion of the recess P. This rod O is secured at one end in the shaft H, and at its other end is provided with a head o, which can slide in the recess P. A shoulder p in the recess P forms a stop for the head o.

By drawing the shaft B inwardly by means of the chain K and wheel M the shafts F and H are drawn within the shaft D as follows: The engagement of the shoulder p with the head o on the rod O will draw the shaft H inwardly, slightly compressing the spring J. The spring J will cause the shaft F to slide within the shaft D to its inner limit. The shaft H will then be drawn within the shaft F, compressing the spring J. The shaft m, upon which the hand-wheel M is mounted, extends across the car, as shown in Fig. 5, and its opposite end is provided with a pulley k', over which an endless chain K' passes. This chain K' operates the shaft B on the opposite side of the car in the same manner as that already described. The chain K' is given a half-twist to cause the chain K' to be driven in a proper direction to move the shaft on that side of the car similar to the shaft B to the side of the car already described.

R represents a shaft mounted in suitable bearings beneath the car A and driven from the shaft B by means of bevel-gear r upon the shaft C, which is provided with a feather adapted to slide in the groove in the shaft B, as already described, so that the shafts B and C rotate together.

Upon the shaft R is loosely mounted a drive-wheel S, from which the axles of the wheels of the car A are driven by bands or chains, as set forth in my former application. The wheel S is provided with one section of a clutch s, which is adapted to be engaged by a clutch-section s', secured upon the shaft R. The clutch s' can be thrown from engagement with the clutch-section s by means of a lever T and a connecting-link t. At any desired time the clutch-sections s s' can be thrown out of engagement, thereby allowing the shafts B and the shaft R to rotate independently.

My apparatus, as above described, is designed to be used chiefly in the class of power appliances as above described, and is particularly designed to be used together; but I do not wish to limit my devices for coupling the adjoining ends of shafts, as B B', to cars employing the other features.

What I claim as new, and desire to secure by Letters Patent, is—

1. The combination, with two shafts, each provided with a bell-mouth, of a shaft F, having a ball-bearing adapted to engage with the bell-mouth of one shaft, and a second shaft H, having a ball-bearing adapted to engage with the bell-mouth of the other shaft, one of said shafts F H being adapted to slide longitudinally within the other shaft, substantially as and for the purpose specified.

2. The combination, with two cars A and shafts mounted on said cars having bell-mouths E E' on their adjoining ends, of a shaft F, having a ball-bearing adapted to engage with the bell-mouth E, a shaft H, having a ball-bearing G' adapted to engage with the bell-mouth E', said shaft H being adapted to slide longitudinally within the shaft F, and a spring J for causing the ball-bearing G' to automatically engage with the bell-mouth E', substantially as specified.

3. The combination, with two shafts having bell-mouths E E' on their adjoining ends, of a longitudinally-extensible coupling device having ball-bearings G G', adapted to engage with the bell-mouths E E', and a spring J for extending said coupling, substantially as and for the purpose specified.

4. The combination, with two shafts having bell-mouths upon their adjoining ends, of a longitudinally-extensible coupling device having ball-bearings upon its ends adapted to engage with the bell-mouths, a spring for extending said coupling, a connecting-rod, and mechanism for contracting said coupling, substantially as specified.

5. The combination, with a rotatable and longitudinally-movable shaft B, of a rotatable shaft D, of larger diameter, having a bell-mouth E, a shaft F, adapted to slide within said shaft D, a shaft H, adapted to slide within said shaft F, a ball-bearing G, through which the shaft F can slide and which rotates with said shaft, a spring J, and rod O, substantially as specified.

6. The combination, with a car, a rotating shaft thereupon, and a rotatable and lengthwise-extensible coupling connected with the shaft, of lever mechanism adapted to be operated at will to positively retract the extensible coupling, substantially as and for the purpose described.

7. The combination, with a car having a pair of rotatable shafts thereupon, of two lengthwise-extensible couplings arranged at diagonally-opposite corners of the car and connected, respectively, with the shafts, and lever mechanism adapted to be operated at will to positively retract the couplings, substantially as and for the purpose described.

8. The combination, with a shaft B', having a bell-mouth E', of a coupling having a ball-bearing G', adapted to engage with the bell-mouth E', a shaft D, having a bell-mouth E, a ball-bearing G upon the coupling, through which said coupling is adapted to slide, a rotatable and longitudinally-movable shaft B, rod O, chain K, connected with said shaft B, and a hand-wheel M, substantially as specified.

9. The combination, with a car, a rotatable shaft arranged longitudinally on said car, a shaft R, arranged on said car, and gearing for driving said shaft R from the longitudinal shaft, of a pulley loosely mounted on said shaft R, driving-gearing for driving the wheels of the car from said pulley, and a clutch upon said shaft R for throwing into and out of action the pulley S, substantially as specified.

10. The combination, with the carrying-wheels of a number of cars in train, of a driving-shaft on each car, a loose pulley on each driving-shaft, driving-gearing for driving the carrying-wheels of each car from its pulley S, a clutch for throwing said pulleys into and out of action, and power-transmitters communicating with the shafts R, substantially as specified.

ALEXANDER R. CAVNER.

Witnesses:
ALBERT H. ADAMS,
HARRY T. JONES.